(12) United States Patent
Murgai et al.

(10) Patent No.: US 10,346,842 B2
(45) Date of Patent: Jul. 9, 2019

(54) SYSTEMS AND METHODS FOR AUTHENTICATING POTENTIALLY FRAUDULENT TRANSACTIONS USING VOICE PRINT RECOGNITION

(71) Applicant: Capital One Financial Corporation, McLean, VA (US)

(72) Inventors: Nikhil Murgai, Providence, RI (US); Leonard Roseman, Richmond, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 15/850,492

(22) Filed: Dec. 21, 2017

(65) Prior Publication Data

US 2018/0114227 A1 Apr. 26, 2018

Related U.S. Application Data

(63) Continuation of application No. 14/132,900, filed on Dec. 18, 2013.

(60) Provisional application No. 61/746,783, filed on Dec. 28, 2012.

(51) Int. Cl.
*G06Q 40/00* (2012.01)
*G06Q 20/40* (2012.01)
*G06Q 20/32* (2012.01)

(52) U.S. Cl.
CPC ..... *G06Q 20/40145* (2013.01); *G06Q 20/322* (2013.01); *G06Q 20/4012* (2013.01)

(58) Field of Classification Search
CPC ............................... G06Q 20/40145
USPC ........................ 705/18; 379/196; 704/273
See application file for complete search history.

(56) References Cited

U.S. PATENT DOCUMENTS

| | | | |
|---|---|---|---|
| 2003/0112942 A1* | 6/2003 | Brown | G06Q 20/4037 379/196 |
| 2009/0048975 A1 | 2/2009 | Felger | |
| 2009/0083160 A1 | 3/2009 | Hagale et al. | |
| 2009/0254971 A1 | 10/2009 | Herz et al. | |
| 2012/0330765 A1* | 12/2012 | Fried | G06O 20/206 705/18 |
| 2014/0172430 A1* | 6/2014 | Rutherford | G06Q 20/20 704/273 |

* cited by examiner

*Primary Examiner* — Samica L Norman
(74) *Attorney, Agent, or Firm* — Finnegan, Henderson, Farabow, Garrett & Dunner, LLP

(57) ABSTRACT

Methods and systems are disclosed for providing fraudulent transaction processes. In one embodiment, a method is disclosed for performing fraudulent transaction processes that may include receiving an indication that a payment transaction has been identified as potentially fraudulent, the payment transaction involving a payment account associated with a user. The method may also include receiving a candidate voice print and comparing the candidate voice print to a user voice print that is associated with the payment account. The method may further include determining, based on the comparison, whether the candidate voice print matches the user voice print, and providing an indication whether the candidate voice print matches the user voice print, the indication configured for use to determine whether to approve or deny the payment transaction.

19 Claims, 3 Drawing Sheets

SYSTEMS AND METHODS FOR AUTHENTICATING POTENTIALLY FRAUDULENT TRANSACTIONS USING VOICE PRINT RECOGNITION

CROSS-REFERENCE TO RELATED APPLICATIONS

This application is a continuation of U.S. patent application Ser. No. 14/132,900, filed on Dec. 18, 2013, which claims priority under 35 U.S.C. 119 to U.S. Provisional Application No. 61/746,783, filed Dec. 28, 2012. The above referenced applications are hereby incorporated by reference in their entireties.

BRIEF DESCRIPTION

Technical Field

The present disclosure relates to systems and methods for performing fraud detection using a stored voice recording.

Background

Account holders sometimes pay for purchases with payment instruments such as credit cards, debit cards, payment cards, online payment systems, or the like) in ways that may be detected as possibly fraudulent. As one example, after making a purchase in the United States, a second purchase in South Korea less than two hours later may be tagged as fraudulent because fraud detection systems may detect that the purchaser could not have traveled from the US to South Korea in the short amount of time between the two purchases. Known fraud detection systems may thus deny or hold the second transaction until the account holder is able to verify that it is a legitimate transaction.

Some fraud detection systems, however, may be too zealous in tagging transactions as fraudulent, resulting in an unacceptably high rate of false positives. This can cause frustration for legitimate users whose transactions are prevented or delayed because of an over-active fraud detection system. Additionally, some known solutions—such as a call center agent manually calling the purchaser to verify the transaction—can be cumbersome and involve high labor costs.

Therefore, more efficient methods and systems are needed to enable purchasers to securely verify that a purchase is not being made fraudulently.

SUMMARY

In certain embodiments, systems and methods are disclosed for providing voice-related processing for fraud detection purposes. For example, in one embodiment, a method is disclosed for performing fraudulent transaction processes that may include receiving an indication that a payment transaction has been identified as potentially fraudulent, the payment transaction involving a payment account associated with a user. The method may also include receiving a candidate voice print and comparing the candidate voice print to a user voice print that is associated with the payment account. The method may further include determining, based on the comparison, whether the candidate voice print matches the user voice print, and providing an indication whether the candidate voice print matches the user voice print, the indication configured for use to determine whether to approve or deny the payment transaction.

In another embodiment, a device is disclosed for providing fraudulent transaction processes that may include at least one processor and a memory storing instructions operable to, when the instructions are executed by the at least one processor, cause the processor to perform operations consistent with disclosed embodiments. In one aspect, the operations may include receiving an indication that a payment transaction has been identified as potentially fraudulent, the payment transaction involving a payment account associated with a user. The operations may also include receiving a candidate voice print and comparing the candidate voice print to a user voice print that is associated with the payment account. The operations may further include determining, based on the comparison, whether the candidate voice print matches the user voice print and providing an indication whether the candidate voice print matches the user voice print, the indication configured for use to determine whether to approve or deny the payment transaction.

Although disclosed embodiments are discussed primarily in the context of fraud detection, disclosed embodiments may also be used in other contexts. For example, disclosed embodiments may be used instead of/in addition to physical signatures (to ratify a card authorization), to authorize transactions involving an overdraft of a debit/payment account, to authorize credit line extensions, to offer related products (for example, product insurance), or the like.

The accompanying drawings, which are incorporated in and constitute part of this specification, and together with the description, illustrate and serve to explain the principles of various exemplary embodiments.

DETAILED DESCRIPTION

Figure 1:
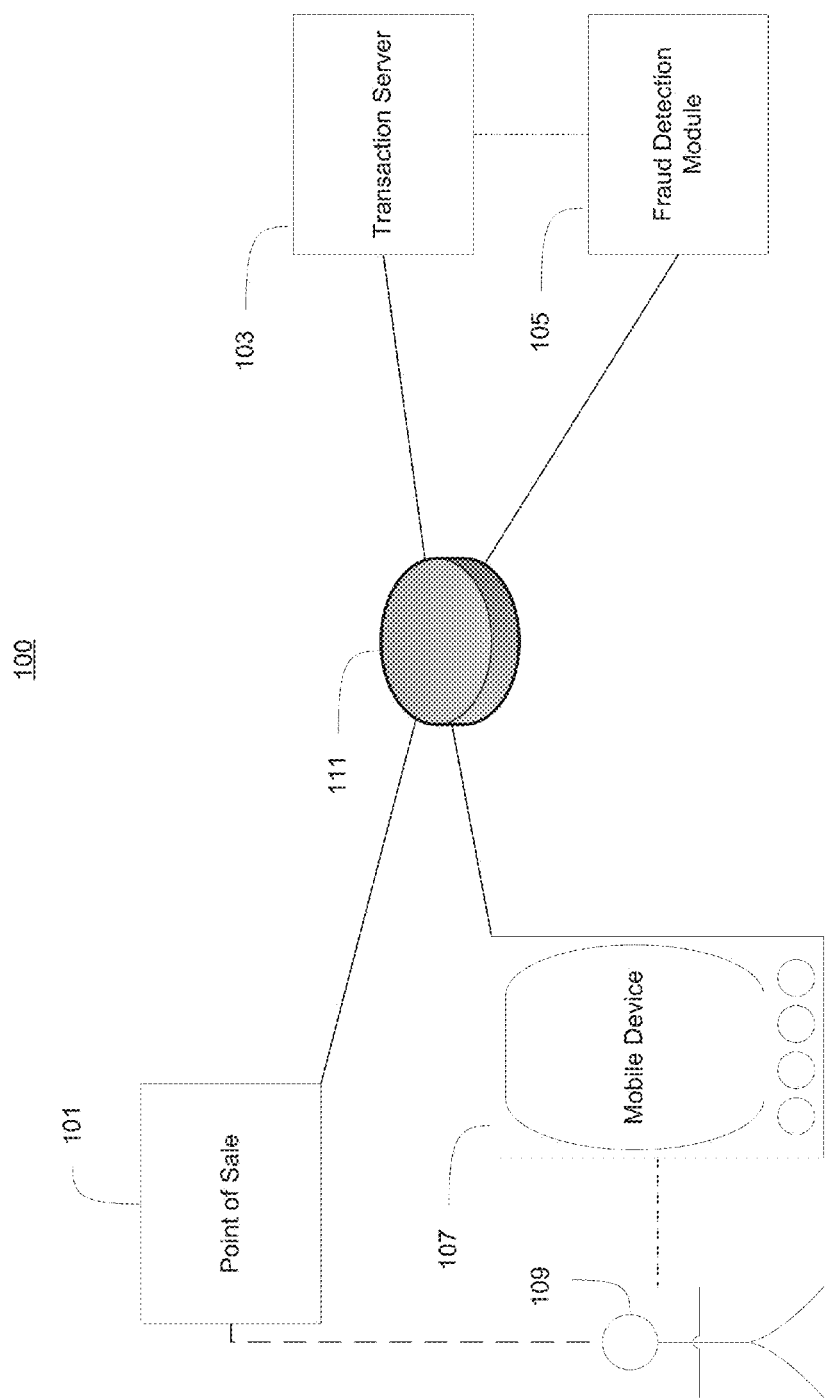
FIG. 1 is a diagram of an electronic network layout 100 over which some embodiments consistent with the present disclosure may be implemented.

Reference will now be made in detail to exemplary embodiments of the present disclosure, examples of which are illustrated in the accompanying drawings. Wherever convenient, the same or like reference numbers will be used throughout the drawings to refer to the same or like parts.

It is to be understood that the disclosure is not limited in its application to the details of construction and to the arrangements of the components set forth in the following description or illustrated in the drawings. Embodiments consistent with the present disclosure encompass variations in addition to those described and can be practiced and carried out in various ways. Also, it is to be understood that the phraseology, terminology, and structure employed herein are for the purpose of explanation and example, and should not be regarded as limiting.

As such, those skilled in the art will appreciate that the conception upon which this disclosure is based may readily be utilized as a basis for designing other structures, methods, and systems for carrying out explicit embodiments of the present disclosure or other embodiments.

Embodiments consistent with the present disclosure include computer-implemented methods, tangible non-transitory computer-readable mediums, and computer-implemented systems. Computer-implemented methods consistent with the present disclosure may be executed, for example, by one or more processors that receive instructions from a non-transitory computer-readable storage medium. Similarly, systems consistent with the present disclosure may include at least one processor and a memory device (such as a non-transitory computer-readable storage medium).

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage media.

Consistent with the present disclosure, memory devices may comprise any type of computer-readable storage medium, unless otherwise specified. A computer-readable storage medium may store instructions for execution by at least one processor, including instructions for causing the processor to perform steps or stages consistent with the embodiments described herein. Additionally, one or more computer-readable storage mediums may be utilized in implementing embodiments consistent with the present disclosure. The term "computer-readable storage medium" should be understood to include tangible items and exclude carrier waves and transient signals.

The disclosed embodiments can be used for verifying payment transactions identified as potentially fraudulent. Some disclosed embodiments enable a purchaser to, after receiving a notification that a transaction has been suspended as potentially fraudulent, continue the transaction through identity verification. In some embodiments, identity verification may be performed using a "voice print" recognition system located, for example, on a mobile device.

FIG. 1 discloses a system 100, which some embodiments consistent with the present disclosure may be implemented. While some components of FIG. 1 are represented in a singular manner, one of ordinary skill would understand that, in some embodiments, components may be combined, omitted, or duplicated.

In one embodiment, Point Of Sale (POS) device 101 may represent a device configured to perform payment transaction processes. A user 109 may effect a payment transaction using POS 101. For example, POS device 101 may be a stand-alone POS device, a cash register, an online retailer, a vending machine, or the like. In some embodiments, POS device 101 could be any form of device, system, or software, operated by user 109 or another entity (such as a merchant—not pictured) to effect payment transactions such as purchases, returns, exchanges, withdrawals (as in the case of, for example, a debit "cash back" transaction) or the like.

Transaction server 103 may represent a device configured to execute software instructions to perform one or more processes consistent with the disclosed embodiments, such as processing payment transactions in a manner consistent with disclosed embodiments. In some aspects, transaction server 103 may represent one or more of a payment processor (for example, entities that supply authorization and settlement services for credit card transactions, or transmit funds between participating institutions), an issuing bank, a depository institution, a credit union, or any other device, system, or software that may be configured to process payment transactions. Processing of payment transactions may include, for example, processing purchase requests (by which a purchaser's account may be debited), processing balance requests (by which a purchaser's account balance may be returned), processing a return request (by which a purchaser's account may be credited), or any other known/unknown payment request.

Fraud detection module 105 may be a device that may be configured to execute software instructions that enable the detection of potentially fraudulent transactions. For example, fraud detection module 105 may be operable to determine whether payment transactions are potentially fraudulent based on a combination of alone or more of past transactions of the purchaser, past transactions of other purchasers, historical lists of fraud transaction locations, the location of a user (based on, for example, the location of the user's mobile device), occurrence of other consumers' fraudulent transactions at the merchant, credit bureau data of the user, or the like. In some embodiments, fraud detection module 105 may receive transaction data about a current payment transaction from transaction server 103; however, other arrangements are possible (for example, receiving transaction data directly from point of sale 101). Fraud detection module 105 may be, in some embodiments, one or more computer devices. For example, fraud detection module 105 may be a server with one or more processors and one or more memory devices storing instructions that can be executed by the processor(s), to perform one or more operations consistent with the disclosed embodiments.

Fraud detection module 105 may, using information (such as the above-mentioned information) determine whether a transaction is more likely than not to be fraudulent. If so, fraud detection module 105 may perform process(es) to attempt to halt or suspend the suspect transaction (and may also "flag" the transaction as fraudulent). In some embodiments, this may be done by communicating with transaction server 103 and/or point of sale 101; however, other arrangements for halting, suspending, and/or flagging suspect transactions are possible with the disclosed embodiments. In one aspect, fraud detection module 105 may flag a suspect transaction as fraudulent by assigning a value in a flag field included, or attached to, a transaction record associated with the suspect transaction under analysis by fraud detection module 105. Fraud detection module 105 may send a message to server 103 and/or POS 101 including the flagged transaction, or alternatively, may send a message including an alert indicating that the suspect transaction is fraudulent.

While FIG. 1 depicts transaction server 103 and fraud detection module 105 as separate components, the disclosed embodiments may include configurations where these elements are part of the same component.

Mobile device 107 may be a smartphone, a mobile phone, a portable electronic device, tablet, a personal digital assistant, or any other electronic device with communication. Device 107 may also include voice capabilities. In certain aspects, mobile device 107 may be configured to enable user 109 to authorize a transaction that has been flagged as potentially fraudulent.

In some embodiments, mobile device 107 may include, for example, a display, a processor, storage (temporary/permanent/flash memory), input devices (such as a keyboard, a touchscreen, a microphone, a data port such as USB, or the like), output devices (such as speakers, headphone ports, or the like), communication mechanisms (such as hardware, software, firmware, or a combination, for implementing communication protocols, including wireless protocols such as Wi-Fi, Bluetooth, cellular telephony, LTE/CDMA/GSM, NFC, RF, or the like), or other components for use with mobile devices, smart phones, or the like. One of ordinary skill will recognize that any or all of these components can be combined, omitted, or duplicated. Mobile device 107 may include software instructions stored in memory that, when executed by one or more processors, perform one or more operations consistent with the disclosed embodiments. In one aspect, mobile device 107 may include a mobile application that generates interfaces that are displayed on a display device to request and receive input from user 109.

User 109 may be a purchaser who is attempting to effect a payment transaction using one or more financial accounts. In some embodiments, user 109 possesses mobile device 107, and mobile device 107 is associated with user 109 and his payment accounts.

Network 111 may be any type of network configured to provide communications between components of FIG. 1, including those described above. For example, network 111 may be any type of network (including infrastructure) that provides communications, exchanges information, and/or facilitates the exchange of information, such as the Internet, a Local Area Network, cellular and/or landline telephone networks, or other suitable connection(s) that enables system 100 to send and receive information between the components of system 100. In other embodiments, one or more components of system 100 may communicate directly through a dedicated communication medium.

Figure 2:
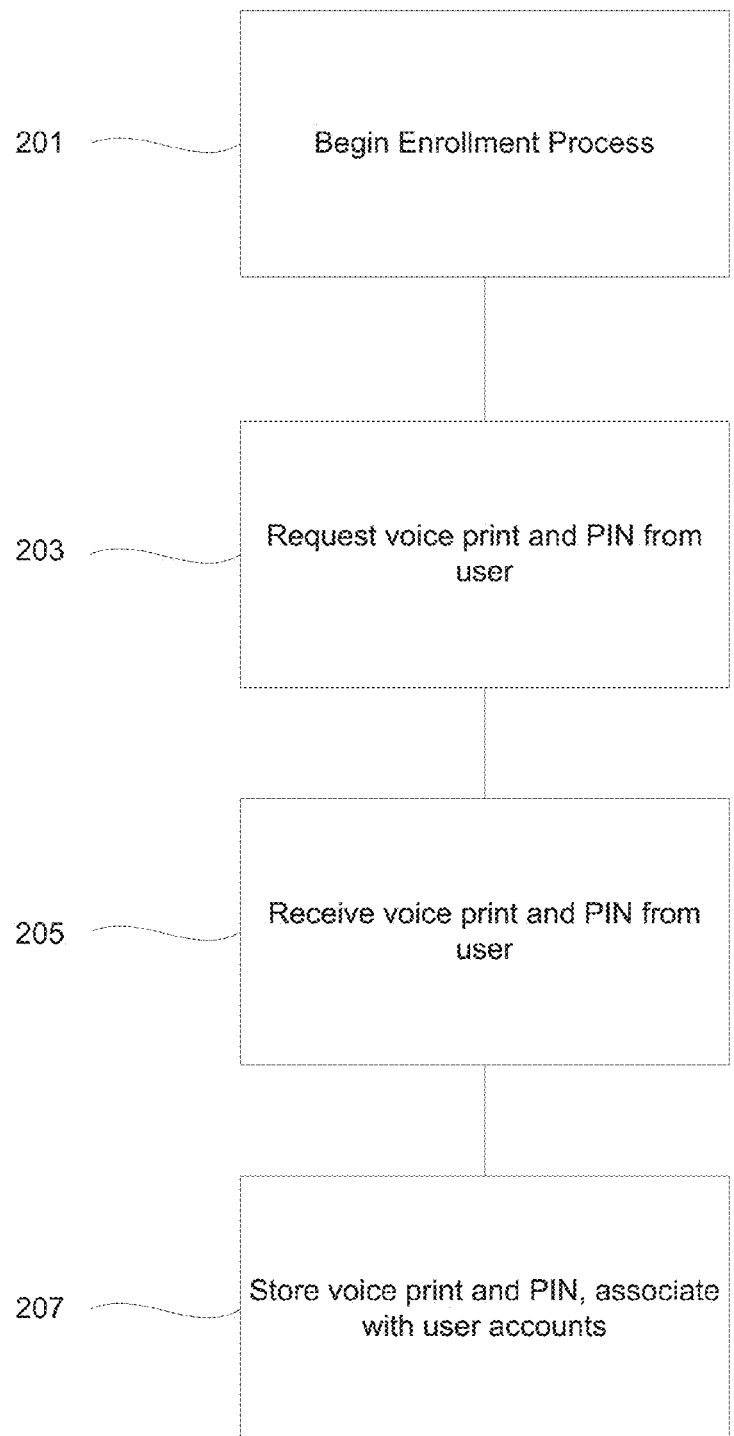
FIG. 2 is a diagram of an exemplary computerized process 200 for implementing embodiments consistent with the present disclosure.

FIG. 2 is a diagram of an exemplary computerized process 200 for implementing certain disclosed embodiments. At step 201, the disclosed embodiments may begin an enrollment process for a user 109 of a mobile device 107. In some embodiments, the user may be a purchaser that is associated with one or more payment accounts provided by a financial service provider. In one embodiment, fraud detection module 105 may perform one or more computer-implemented processes to solicit the participation of user 109 in a fraud protection program offered by the provider of a payment account associated with user 109. In some embodiments, fraud detection module 105 may communicate with mobile device 107 to effect the solicitation. For example, user 109 may be prompted on mobile device 107, in step 203, to provide a "voice print" for recording. In some embodiments, mobile device 107 may execute software that generates an interface to prompt the user to speak a specific pass phrase, such as "accept charge" or "verify transaction." In other embodiments, mobile device 107 may execute software processes that enable the user to choose a unique pass phrase. Mobile device 107 may store the unique pass phrase for user 109 in a memory included in mobile device 107, which is accessed when authorizing a pass phrase spoken by user 109 when attempting to authorize a flagged transaction.

In some embodiments, user 109 may be solicited by the above-mentioned mobile application on mobile device 107 to provide a voice print while in a brick-and-mortar bank, may be solicited to provide a voice print by mobile device 107 when user 109 is speaking with a call center, or the like. In addition, in some embodiments, users ray be enticed to participate in the voice print system through offers. For example, users may be offered a lower APR, an increased credit line, increased cash back/points/other rewards on purchases, or the like. If user 109 consents to provide a voice print, mobile device 107 may, in some embodiments, send a message to fraud detection module 105 indicating user 109's desire to provide a voice print (including, for example, an indication of any incentives that were offered to user 109 in exchange for a voice print).

In some embodiments, mobile device 107 may be configured to generate a prompt for user 109 to provide a PIN (Personal Identification Number) to associate with the payment accounts and/or the voice print (step 203). The PIN may be any type of identifier that can be configured in any type of known format for similar types of identifiers. For example, the PIN may be a four-digit number that is known only to the user. Other types of PINs are possible, including alphanumeric passwords, item selection, picture passwords, question-and-answer combinations, or the like. In other embodiments, a PIN may not be requested from the user, and a previously established PIN (for example, the user's ATM card PIN) or password (for example, the user's online banking password) may be used.

In step 205, mobile device 107 may receive and store an audio recording of the phrase spoken by the user. For example, mobile device 107 may utilize a microphone and audio recording process performed by the device to receive and record user 109's spoken input. Additionally or alternatively, mobile device 107 may store a phrase spoken by user 109 as a spectrogram, i.e., voice print. Mobile device 107 may be configured to request the PIN from the user. In certain embodiments, mobile device 107 may perform processes that receives the PIN from user 109 via voice recording, such as described above, or through other input mechanisms, such as a keypad, keyboard, menu option, etc. that may provided via an interface generated by mobile device 107 on a display.

In step 207, the disclosed embodiments may store and associate user 109's received voice print and PIN with user 109 and one or more of user 109's payment accounts. For example, mobile device 107 may be configured to store the PIN and the voice print in memory of mobile device 107. Additionally, the disclosed embodiments may be configured to store the voice print and/or PIN on other devices. For example, mobile device 107 may be configured to send a message including user 109's voice print and/or PIN to server 103, which may store the information in a memory device for subsequent use. For instance, when user 109 attempts to authorize a transaction using voice commands via mobile device 107, mobile device 107 may execute software that requests the stored user 109's voice print and/or PIN from server 103. Alternatively, mobile device 107 may be configured to send user 109's received input to server 103 to authorize the input by comparing the input to the stored user 109's voice print or PIN.

Figure 3:
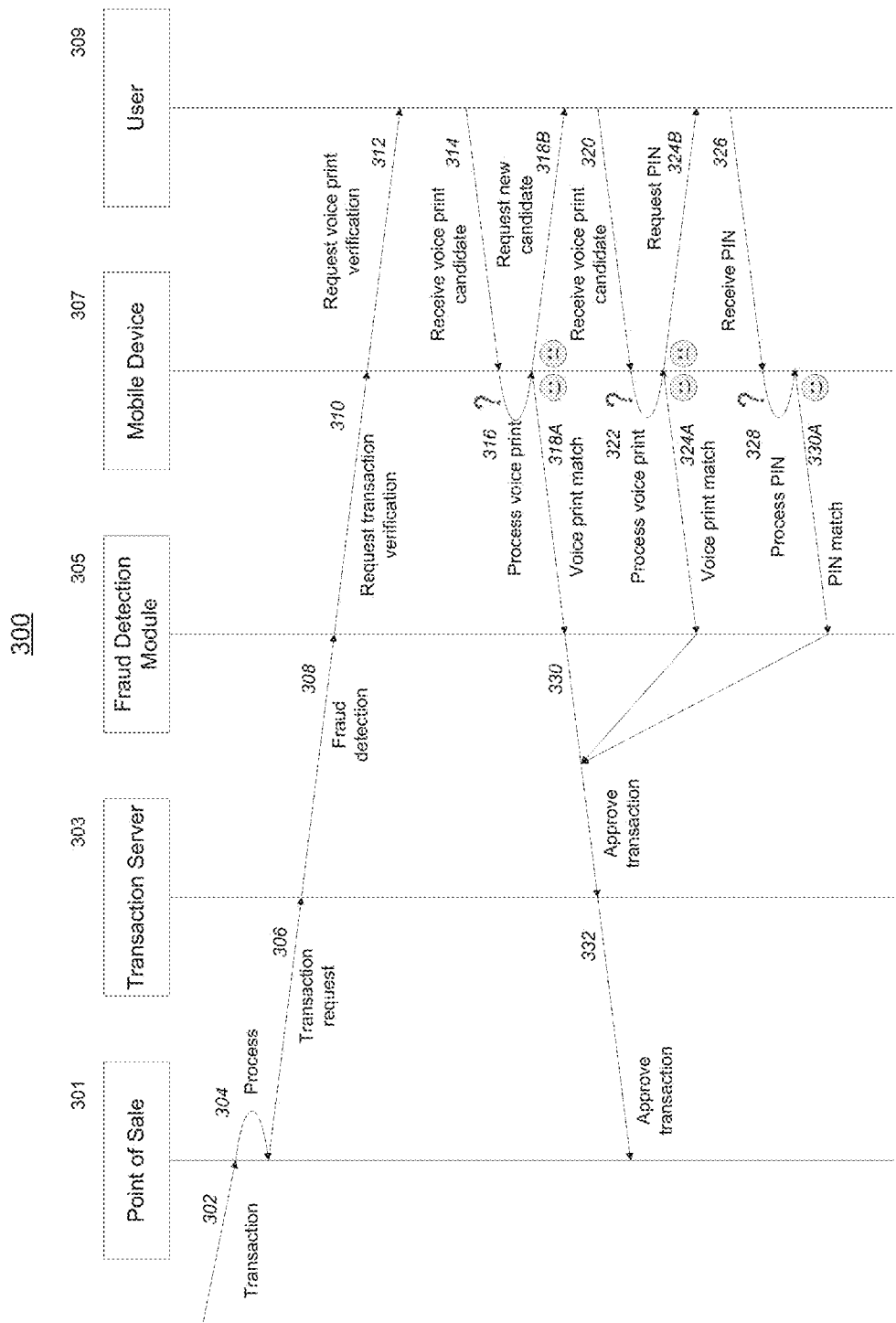
FIG. 3 is a diagram of an exemplary computerized process 300 for implementing embodiments consistent with the present disclosure.

FIG. 3 is a diagram of an exemplary computerized process 300 for implementing embodiments consistent with the present disclosure. As will be understood by one of ordinary skill, the diagram and its order of operations are merely exemplary. Thus, as will be understood by one of ordinary skill, disclosed steps may be performed in a different order, repeated, omitted, or may vary from those steps explicitly disclosed in FIG. 3. Components 301, 303, 305, 307, and 309 of FIG. 3 may correspond to components 101, 103, 105, 107, and 109, respectively of FIG. 1. Accordingly, components 301, 303, 305, 307, and 309 of FIG. 3 may be configured as, and operate similar to, components 101, 103, 105, 107, and 109, respectively of FIG. 1, as disclosed herein.

A payment transaction may begin at step 302 when a transaction is received by POS device 301. For example, user 309 may attempt to make a purchase at POS device 301 by tendering a credit card or other payment means. At step 304, POS device 301 may attempt to process the transaction. This can include, for example, determining that transaction server 303 can process the transaction. For example, if POS device 301 is attempting to process a transaction using a particular brand of credit card, and transaction server 303 may represent a server associated with a financial service provider for that particular credit card. Using known POS transaction processes, POS 301 may determine that transaction server 303 should be used to process the transactions. Other procedures and systems for processing transactions may be implemented as part of this step, as one of ordinary skill will recognize.

In step 306, POS device 301 may generate and send a transaction request to transaction server 303. In one aspect, transaction request may include transaction information reflecting the transaction, such as amount, payment account used to attempt the purchase, timestamp information, merchant information, etc.

Transaction server 303, after receiving the transaction request in step 306, may generate and send a fraud detection request to fraud detection module 305 (step 308).

Fraud detection module 305 may receive the fraud detection request and perform processes for determining whether the transaction is potentially fraudulent. In one embodiment, upon determining that the transaction referenced by the transaction request is potentially fraudulent, fraud detection module 305 may generate and send a transaction verification request to mobile device 307 (step 310).

In one embodiment, fraud detection module 305 may also "pause" or "suspend" the transaction while mobile device 307 is processing the transaction verification. Suspending the transaction may comprise, for example, sending a message to transaction server 303 to halt processing of the transaction request until verification of the transaction is completed; however, other arrangements are possible as well.

In response to the transaction verification request, mobile device 307 may alert user 309 that the transaction has been flagged as potentially fraudulent. Alerting the user may include, for example, alerting the user through a mobile application executing on mobile device 307. For example, mobile device 307 may execute software that generates an interlace that is displayed on a display device that identifies the transaction as potentially fraudulent. Alerting the user may be accomplished by a number of known or unknown methods—for example, a sound alert, a vibrating alert, a visual alert, or the like.

In one aspect, mobile device 307 may execute software that generates and presents a voice print verification request (step 312). In one aspect, mobile device 307 may execute software that may prompt user 309 to speak a pass phrase that corresponds to user 309's previously-recorded voice print.

In certain embodiments, mobile device 307 may be configured to assist user 309 in recalling the requested voice print. For example, mobile device 307 may execute software instructions that display the voice print on a display of the mobile device. In other embodiments, mobile device 307 may provide the user's voice print via sound files, such as playing an audio rendition of the voice print user 309 through a headphone, headset, speaker, or the like. This enables the user to recall what phrase user 309 must say to verify the transaction. In some embodiments, the phrase is not displayed on the device. Other embodiments—such as a brief reminder about the contents of the phrase, or a user-defined hint, may be implemented by the disclosed embodiments.

Mobile device 307 may receive a candidate voice print from user 309 (step 314). This may include, for example, user 309 speaking the voice print candidate into a headset or microphone of mobile device 307, such that mobile device 307 may receive the candidate voice print from user 309.

At step 316, mobile device 307 may execute software instructions to process the received candidate voice print. For example, mobile device 307 may compare the received candidate voice print with a pre-recorded voice print associated with user 309, such as, for example, the voice print set by a user when configuring the pass phrase disclosed above in connection with FIG. 2. The disclosed embodiments may implement known voice comparison processes, algorithms, and/or systems to process the received candidate voice print. For example, mobile device 307 may include and execute known speech recognition technologies to compare the candidate voice print with the pre-recorded voice print associated with user 309. As an example, mobile device 307 may implement speech recognition algorithms described in "Speaker Recognition" by Homayoon Beigi (appearing in *Biometrics*, Ed. Dr. Jucheng Yang. Intech, 2011. ISBN: 978-953-307-618-8), which is hereby incorporated by reference. The disclosed embodiments may implement speech recognition processes that allow for variations in speech and sound, such that the received candidate voice print and the pre-recorded voice print need not be an exact match to pass verification. Rather, a "match rate" or thresholds may be applied to determine whether the candidate voice print is a valid voice print for user 309. For example, mobile device 307 may execute processes that determines whether a match rate between the pre-recorded voice print and the candidate voice print received in step 314 is equal to or higher than a determined value, such as, for example, a 75% match.

If mobile device 307 determines that there is a voice print match (step 318A), mobile device 307 may generate and send a message to indicate to fraud detection module 305 that the transaction is not fraudulent and that the transaction processing should be completed. Fraud detection module 305 may receive the message from mobile device 307 and perform processes to approve the transaction (step 330). In other embodiments, mobile device 307 may send to fraud detection module 305 the candidate voice print for processing. For instance, fraud detection module 305 may perform processes that process the received candidate voice print, compare the candidate voice print to a stored version of user 309's pre-recorded voice print to determine a match rate, and determine based on the comparison whether the transaction processing should be completed. At step 330, fraud detection module 305 may generate and send a message to transaction server 303 to approve the transaction. Transaction server 303 may receive the approval message from fraud detection module 305 and in response, generate and send a message to POS device 301 to approve the transaction.

In some situations, however, mobile device 307 may determine that user 309 has not authorized the transaction. For example, the match rate between the candidate voice print received in step 314 and the previously-recorded voice print may be lower than a determined value. This may occur, for example, when there is too much background noise when user 309 inputs the candidate voice print and/or user 309 may not have responded during a timeout period (e.g., because user 309 was not aware of an alert on mobile device 307). If mobile device 307 (or fraud detection module 305) determines that the candidate voice print does not match the user's pre-recorded voice print, mobile device 307 may send a message to fraud detection module 305 indicating that a match is not made. In other embodiments, fraud detection module 305 may determine that there is no match based on the received candidate voice print from mobile device 307. In response to a determination of no match, in some embodiments, fraud detection module 305 may determine that the transaction is fraudulent. Based at least on the determination that the transaction is fraudulent, fraud detection module 305 may send a message to transaction server 303 (as mentioned above) to deny the transaction. Transaction server 303 may also send a message to POS device 301 denying the transaction.

In some embodiments, however, if a match is not made, mobile device 307 may re-initiate the verification process and/or initiate other verification procedures. For example, at step 318B mobile device 307 may request a second candidate voice print from user 309. In some embodiments, the request for a second candidate voice print may be conditioned on the receipt of additional verified identification information. For example, mobile device 307 may execute software instructions that generate a prompt for the user to go to a less noisy location if mobile device 307 determines that the received candidate voice print could not be processed because of excess background noise. Mobile device 307 may process the second candidate voice print at step 322, using the same or similar methods mentioned above with respect to step 316. If mobile device 307 determines that the second candidate voice print matches the user's pre-recorded voice print (e.g., the match rate for the second candidate voice print is sufficiently high), mobile device 307 may generate and send a message to fraud detection module 305 to approve the transaction in step 324A and the transaction approval process continues as disclosed above in connection with steps 330 and 332.

However, if mobile device 307 determines that the second candidate voice print does not match the user's pre-recorded voice print (e.g., the match rate of the second candidate voice print is too low, the second candidate voice print input includes too much noise information, no response is received, etc.), in step 324B, mobile device 307 may prompt user 309 to enter a PIN to authorize the transaction. In some embodiments, the requested PIN may correspond to the PIN set by the user, such as performed in FIG. 2; however, other PINs are possible as well (such as a user's ATM card PIN, a user's online banking password, or the like). Mobile device 307 may receive a PIN input from user 309 (step 326). In certain aspects, user 309 may enter the PIN by, for example, pressing keys representing the PIN, speaking the PIN into mobile device 307, actuating a screen or keys on the device to enter the PIN, or the like.

In step 328, mobile device 307 may process the PIN received in step 326 to determine whether the transaction is fraudulent or not. If the PIN received in step 326 matches a previously-stored PIN, mobile device 307 may then send a message to fraud detection module 305 to approve the transaction in step 330A (as mentioned above). If not, mobile device 307 may send a denial message in 330A (as mentioned above).

In certain embodiments, if no response to the transaction verification request is received by fraud detection module 305 within a certain amount of time, fraud detection module 305 may "time out." In some embodiments, after timing out, fraud detection module 305 may conclude that user 309 would not authorize this transaction, and send a message to transaction server 303 (as mentioned above) to deny the transaction. Similarly, if user 309 does not respond to the requests from mobile device 307 (in exemplary FIG. 3, the requests in steps 312, 318B, and 324B), mobile device 307 may also time out, conclude that user 309 would not authorize this transaction, and send a message to fraud detection module 305 to deny the transaction, Fraud detection module 305 may then send a message to transaction server 303 to deny the transaction as mentioned above.

The methods and systems consistent with the disclosed embodiments are not limited to the examples described herein. Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims.

In combination with the appended claims and figures, those of ordinary skill in the art reading this specification will understand that other embodiments and variations are possible. In particular, those having ordinary skill in the art will recognize that steps 316-330A may be performed in a different order, by different components of system 100 (shown or not shown), with a different number of steps, or with a different number of repetitions. For example: a PIN may be requested after a first candidate voice print does not pass the verification processes disclosed above; the mobile device 307 may continually request voice print verifications until user 309 gives up or the transaction times out; user 309 may be given the option to speak with a call center agent after a number of attempts; or the like.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, flash memory, solid state disks, CD-ROM, or other forms of RAM or ROM. Accordingly, the disclosed embodiments are not limited to the above described examples, but instead is defined by the appended claims in light of their full scope of equivalents.

What is claimed:

1. A system for validating potentially fraudulent transactions, the system comprising:
   one or more memory devices; and
   one or more processors configured to execute instructions to:
   receive, from a server, an indication that a payment transaction is potentially fraudulent, the payment transaction being associated with a payment account of a user;
   transmit, to a mobile device, a request for a candidate voice print determination based on the received indication;
   render information to assist the user in ascertaining a phrase associated with the candidate voice print, the information comprising at least one of a played-back sound, a displayed hint, or the phrase itself;
   receive, from the mobile device, an analysis including a comparison of a candidate voice print to a stored user voice print associated with the payment account of the user, the analysis having been completed by the mobile device; and
   provide, to the server, an indication whether to approve or deny the payment transaction based on at least the analysis received from the mobile device.

2. The system of claim 1, wherein the one or more processors are further configured to execute instructions to validate the candidate voice print when the candidate voice print meets or exceeds a voiceprint match threshold associated with the payment account of the user.

3. The system of claim 1, wherein the one or more processors are further configured to execute instructions to:
   determine whether to validate the candidate voice print;

initiate an additional verification procedure when a determination not to validate is made, the additional verification procedure comprising:
transmitting, to computing device, a request for a PIN associated with the payment account from the user; and
receiving, from the computing device, the request for the PIN associated with the payment account from the user; and
provide, to the server, an indication whether to approve or deny the payment transaction based on the additional verification procedure.

4. The system of claim 1, wherein the one or more processors are further configured to execute instructions to:
determine whether to validate the candidate voice print;
initiate an additional verification procedure when a determination not to validate is made, the additional verification procedure comprising:
transmitting, to a computing device, a request that the user provide a second candidate voice print; and
receiving, from the computing device, the request that the user provide a second candidate voice print; and
provide, to the server, an indication whether to approve or deny the payment transaction based on the additional verification procedure.

5. The system of claim 1, wherein the one or more processors are further configured to execute instructions to:
determine whether to validate the candidate voice print; and
suspend the payment transaction pending the determination of whether to validate the candidate voice print.

6. The system of claim 1, wherein the one or more processors are further configured to execute instructions to:
determine whether to validate the candidate voice print; and
provide, to a point-of-sale device, an indication whether to approve or deny the payment transaction based on at least the determination.

7. The system of claim 1, wherein the one or more processors are further configured to execute instructions to:
determine whether to validate the candidate voice print;
initiate an additional verification procedure when a determination not to validate is made, the additional verification procedure comprising:
transmitting, to a mobile device, a request that the user relocate to a new location; and
receiving, from the mobile device, the request that the user relocate to a new location; and
provide, to the server, an indication whether to approve or deny the payment transaction based the additional verification procedure.

8. The system of claim 7, wherein the one or more processors are further configured to execute instructions to suspend the payment transaction pending completion of the additional verification procedures based at least on the determination not to validate.

9. The system of claim 1, wherein the stored user voice print is stored on the server.

10. The system of claim 9, wherein the one or more processors are further configured to execute instructions to:
request the stored voice print from a remote server; and
receive the stored voice print in response to the request.

11. The system of claim 9, wherein the stored user voice print is stored on the mobile device, and the mobile device is associated with the user.

12. The system of claim 1, wherein the voice print comprises a recorded oratory recitation of a passphrase comprising at least one of a phrase chosen by the server, a phrase predetermined by the user, or a user PIN number associated with the purchase account.

13. The system of claim 12, wherein the one or more processors are further configured to execute instructions to:
receive an indication that the user has forgotten the passphrase; and
provide a user-defined hint for the passphrase.

14. A method for validating potentially fraudulent transactions, the method comprising:
receiving, from a server, an indication that a payment transaction is potentially fraudulent, the payment transaction being associated with a payment account of a user;
transmitting, to a mobile device, a request for a candidate voice print from the user based on the received indication:
rendering information to assist the user in ascertaining a phrase associated with the candidate voice print, the information comprising at least one of a played-back sound, a displayed hint, or the phrase itself;
receiving, from the mobile device, an analysis including a comparison of a candidate voice print to a stored user voice print associated with the payment account of the user stored on the mobile device, the analysis having been completed by the mobile device; and
providing, to the server, an indication whether to approve or deny the payment transaction based on at least the analysis received from the mobile device.

15. A system for enrolling a user in a fraud detection program, comprising:
one or more memory devices; and
one or more processors configured to execute instructions to:
receive, from a server, a request for fraud detection associated with a purchase account of a user;
transmit, to a mobile device, a request for a user voice print based on the received request for fraud detection;
render information to assist the user in stating a phrase associated with the candidate voice print, the information comprising at least one of a played-back sound, a displayed hint, or the phrase itself;
receive the user voice print while the mobile device is at a physical location associated with the financial service provider;
store the voice print on the mobile device; and
associate the user voice print with the purchase account of the user, the user voice print configured for use in authorizing payment transactions using the payment account.

16. The system of claim 15, wherein the voice print comprises a recorded oratory recitation of a passphrase, and the one or more processors are further configured to execute instructions to:
request a user-defined hint for the passphrase; and
associate the user-defined hint with the purchase account.

17. The system of claim 15, wherein the one or more processors are further configured to execute instructions to transmit, to the mobile device, an offer conditioned upon enrolling in fraud detection for the purchase account.

18. The system of claim 17, wherein the offer comprises at least one of a lower interest rate, an increased credit limit, or increased rewards in a reward program.

19. The system of claim 18, wherein the offer is associated with one or more accounts of the user other than the purchase account provided by the financial service provider.

\* \* \* \* \*